United States Patent Office 2,750,432
Patented June 12, 1956

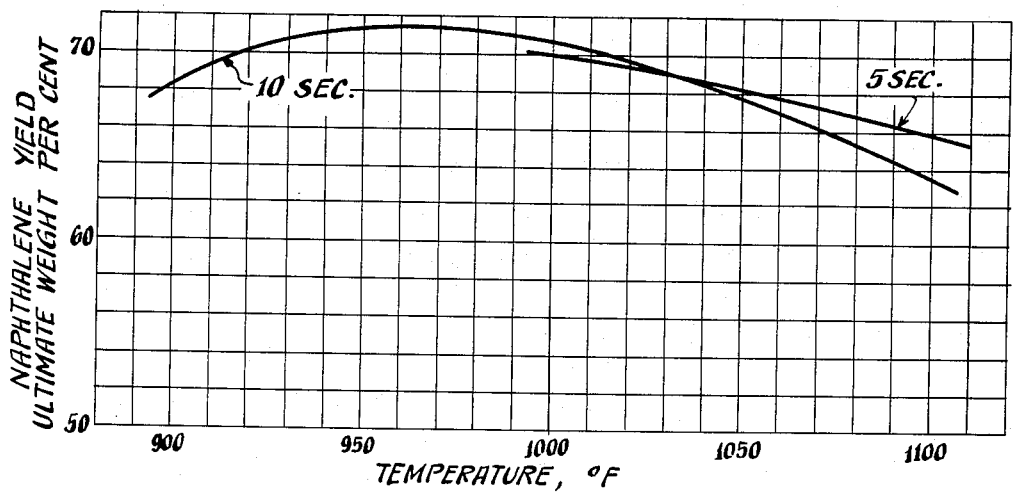
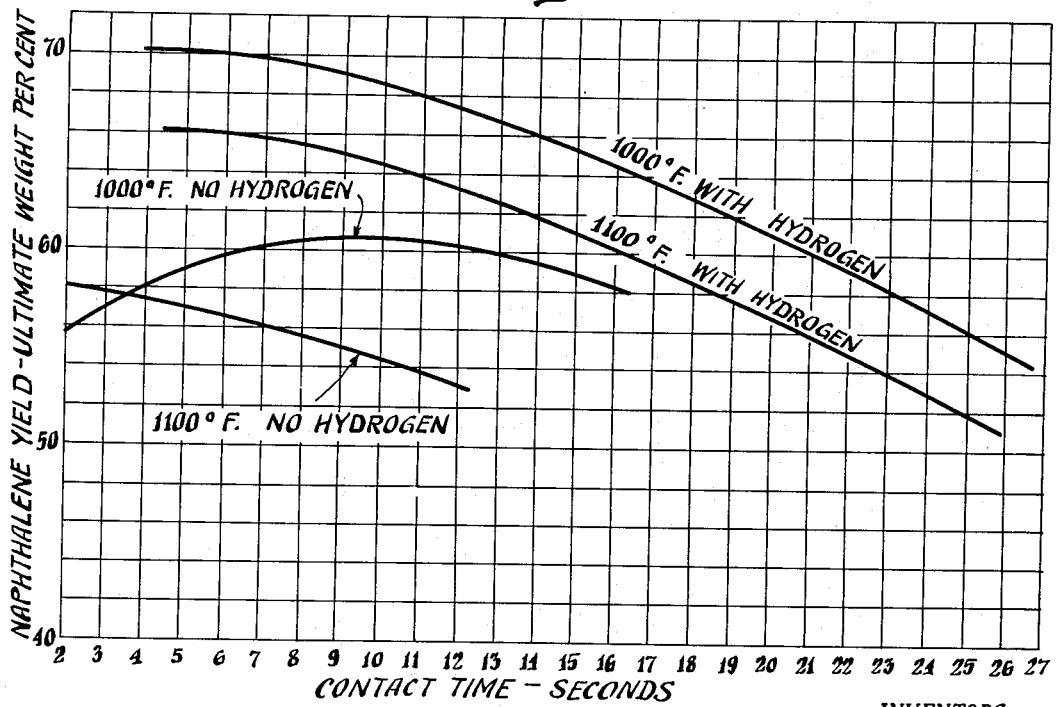

2,750,432
PRODUCTION OF NAPHTHALENE

Harry L. Coonradt, Woodbury, and Barton W. Rope, Mullica Hill, N. J., assignors to Socony Mobil Oil Company, Inc., a corporation of New York Application September 16, 1952, Serial No. 309,928

9 Claims. (Cl. 260—672)

This invention relates to the production of naphthalene. It is more particularly concerned with the production of naphthalene from methylnaphthalenes.

As is well known to those familiar with the art, numerous catalysts have been proposed for removing alkyl groups containing two or more carbon atoms from alkyl-aromatic compounds. The reaction proceeds easily and in good yields. In direct contrast thereto, however, demethylation, i. e., the removal of the methyl group from a methyl-substituted aromatic compound, has been relatively difficult to accomplish. Additionally, the yields obtained have been relatively low. In U. S. Patent No. 2,194,449, it has been proposed to effect the demethylation of methylnaphthalenes in the presence of clay type catalysts. The yields of naphthalene, however, were fairly low. This reaction was subjected to further study by Hansford et al., in Ind. Eng. Chem., 37, 671 (1945). Better yields were obtained by the writers when a bead type silica-alumina catalyst was used. The reaction was also investigated by Greensfelder et al., Ind. Eng. Chem., 37, 1168 (1945). In all cases, the highest yields of naphthalene obtainable were in the order of 55–60 per cent, based on the weight of methylnaphthalene charged. It will be appreciated that it is desirable to achieve a process wherein the catalytic production of naphthalene from methylnaphthalenes can be achieved in higher yields.

It has now been found that naphthalene can be produced from methylnaphthalenes by a catalytic process that is relatively simple and which is commercially feasible. It has been discovered that naphthalene can be produced from methylnaphthalenes by a process which involves contacting the methylnaphthalene with a silica-alumina catalyst in the presence of hydrogen gas.

Accordingly, it is an object of the present invention to provide a catalytic process for the production of naphthalene, which is simple and commercially feasible. Another object is to provide an improved catalytic process for the production of naphthalene from methylnaphthalenes. A more specific object is to provide an improved process for producing naphthalene from methylnaphthalenes, in the presence of silica-alumina catalyst and of hydrogen gas. A further object is to provide a method for the hydrogenolysis of methylnaphthalenes to naphthalene in the presence of silica-alumina catalysts. Other objects and advantages of the present invention will become apparent to those skilled in the art, from the following detailed description taken in conjunction with the drawings, in which:

Figure 1:
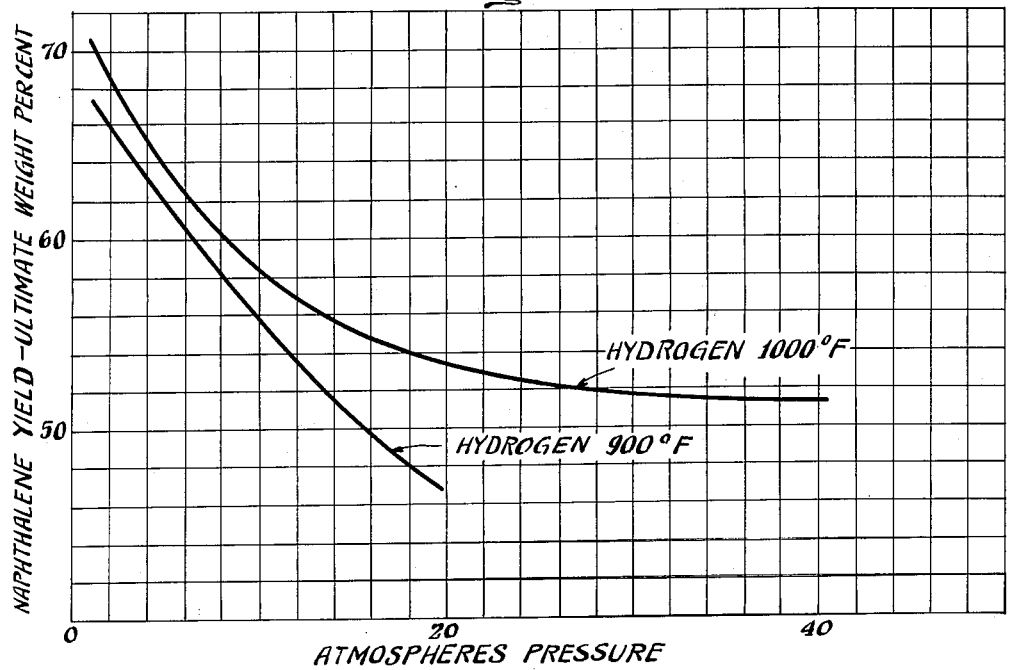
Figure 1 shows two curves representing graphically the relationship between hydrogen pressure and the yield of naphthalene obtained by contacting 2-methylnaphthalene with silica-alumina catalyst for 10 seconds contact time and at 900° F. and at 1000° F. temperature.

Fig. 3 shows two curves representing graphically the relationship between yield of naphthalene from 2-methyl-naphthalene and temperature, when contacting the 2-methylnaphthalene with silica-alumina catalyst, in the presence of hydrogen, at atmospheric pressure, and for contact times of five seconds and 10 seconds; and Fig. 4 shows a curve representing graphically the relationship between contact time and the yield of naphthalene obtained by contacting 2-methylnaphthalene with silica-alumina catalyst, at 1000° F. and at 1100° F., in the presence of added hydrogen at atmospheric pressure; and at 1000° F. and 1100° F., at atmospheric pressure, in the absence of added hydrogen.

In general, the present invention provides a process for the demethylation of methylnaphthalenes, which comprises contacting the methylnaphthalene with a silica-alumina catalyst, at a temperature of between about 900° F. and about 1200° F., for a period of time of between about one second and about 60 seconds, and in the presence of hydrogen gas at substantially atmospheric pressure.

In its broadest aspect, the present invention contemplates the removal of one or more methyl radicals, i. e., the demethylation, of a methyl-substituted naphthalene by a process of hydrogenolysis in the presence of silica-alumina catalyst. The preferred embodiment thereof, however, relates to the production of naphthalene from monomethylnaphthalenes. Non-limiting examples of the methylnaphthalenes utilizable as charge stocks in the process of the present invention are 1-methylnaphthalene; 2-methylnaphthalene; 1,4-dimethylnaphthalene; 2,3-dimethylnaphthalene; 2,7-dimethylnaphthalene; 1,2,3-trimethylnaphthalene; 1,2,5-trimethylnaphthalene; 1-methyl-4-ethylnaphthalene; tetramethylnaphthalene; 1-methyl-7-isopropylnaphthalene; and 1,4-dimethyl-6-ethylnaphthalene. The charge material can be a relatively pure methylnaphthalene, or it can be a mixture of two or more methylnaphthalenes. Likewise, the charge stock can be a hydrocarbon fraction which is rich in methylnaphthalenes, such as certain aromatic petroleum fractions.

The catalyst utilizable in the process of this invention is a silica-alumina cracking catalyst. It ordinarily comprises between about 5 per cent and about 20 per cent, by weight, of alumina, with the balance, i. e., between about 95 per cent and about 80 per cent, by weight, being silica. Preferably, the catalyst contains between about 8 per cent and about 15 per cent alumina, by weight. Also, there can be incorporated into the catalysts minute amounts of materials adapted to improve other characteristics of the catalyst. For example, minute amounts, between about 0.05 per cent and about 1.0 per cent, by weight, of chromia can be added to the catalyst to assist in after burning properties of the catalyst during regeneration. This amount of chromia is not a promoter, since it does not affect the catalytic activity. Such a catalyst is still basically a silica-alumina catalyst with respect to activity. Such catalysts are described in copending application Serial No. 127,626, filed November 16, 1949. The silica-alumina catalyst can be in any usual form in which such catalysts are used, i. e., rods, pellets, spheres, etc. Preferably, however, the catalyst is in the form of spheroidal, bead-like particles, having a particle size of between about 4 and about 12 mesh. Such particles can be prepared, feasibly, in accordance with the method described in United States Letters Patent No. 2,384,946. Reference should be made thereto for the procedures involved.

The process of this invention is carried out in the presence of hydrogen gas, or of a gas which is rich in hydrogen, such as the gas produced in various reforming operations. The hydrogen gas can be introduced into the reactor along with the methylnaphthalene charge stock, or it can be introduced separately, mixing occurring in the reactor. The molar proportion of hydrogen to methylnaphthalene can vary between about 1:2, respectively, and about 10:1, respectively, and preferably between about 6:1, respectively, and about 2:1, respectively. It has been found that a proportion of about 6:1 is especially feasible.

Referring now to the curves shown in Fig. 1, which are based on data set forth in the examples, infra, obtained by contacting 2-methylnaphthalene with a silica-alumina bead-form catalyst, for a 10-second contact time, in the presence of hydrogen, in a molar proportion of hydrogen to methylnaphthalene of about 6:1, at various temperatures, and under several pressures, it will be observed that the yields of naphthalene are much higher at atmospheric pressure, at any given temperature. The pressure in the reactor, i. e., the hydrogen gas pressure, should be maintained, preferably, at about atmospheric pressure, or at subatmospheric pressures. In general, it has been found that as the hydrogen pressure is increased, the yield of demethylated methylnaphthalene decreases. Improved yields of demethylated products are obtained at pressures up to about 5 atmospheres. At higher pressures, however, there is little advangtage to be gained by the use of added hydrogen. Superatmospheric pressures should be avoided, as a general rule.

Figure 2:
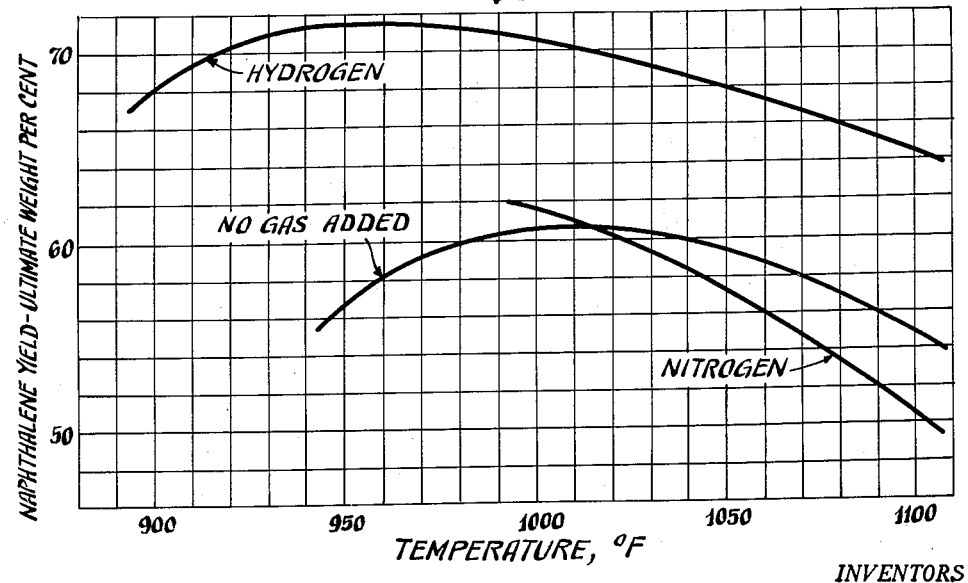
Fig. 2 shows a series of curves representing graphically the effect of added gases on the yield of naphthalene from 2-methylnaphthalene at various temperatures, when contacting the 2-methylnaphthalene with silica-alumina catalyst for a contact time of 10 seconds.

The vastly improved results, obtained by the process of this invention, are achieved only when hydrogen gas is added. Referring to the curves shown in Fig. 2, it is apparent that the addition of hydrogen effects superior yields of naphthalene. These curves are based on data (set forth hereinafter in the examples) obtained by contacting 2-methylnaphthalene with a bead-form silica-alumina catalyst, at various temperatures, for a 10-second contact time, at atmospheric pressure, and (1) in the absence of added gases, (2) in the presence of hydrogen, and (3) in the presence of nitrogen gas; the gases, in each instance, being added in a molar proportion of gas to methylnaphthalene of about 6:1. From these curves it will be noted that maximum yields of over 70 per cent were achieved when hydrogen was used, as opposed to maximum yields of about 60 per cent in the absence of hydrogen. When an inert diluent gas, such as nitrogen, was used, the yield was not much improved. In addition to the foregoing, it has been found that hydrocarbons which are often added to conversion processes, to decompose to form hydrogen, are not effective in the present process. Indeed, hydrogen gas itself, not a hydrogen gas forming substance or a diluent, is the only substance found to be effective in the improved process of this invention.

The contact temperature, i. e., the catalyst temperature, and the contact time are interdependent. Referring to the curves shown in Fig. 3, which are based upon data (set forth hereinafter in the examples) obtained by contacting 2-methylnaphthalene with a silica-alumina catalyst, at various temperatures, in the presence of hydrogen under atmospheric pressure and in a molar proportion of hydrogen to methylnaphthalene of about 6:1, and for contact times of 5 seconds and of 10 seconds, it will be seen that excellent yields of naphthalene were obtained at temperatures of between about 900° F. and about 1100° F., with optimum yields at between about 900° F. and about 1050° F. In general, the present process is found to be operable at temperatures of between about 900° F. and about 1200° F., and, preferably, between about 900° F. and about 1100° F. It will also be noted that, at higher temperatures, the shorter contact time produces optimum ultimate yields of naphthalene. The converse holds true at lower temperatures. Conversion per pass, on the other hand, is highest when a combination of higher temperature and longer contact time is used. The ultimate yield, however, suffers under these conditions. Thus, the selection of reaction conditions is dependent upon whether greater yield per pass or high ultimate yield is desired. The selection of the conditions to effect the desired result is made in view of the considerations set forth hereinbefore.

The curves shown in Fig. 4 are derived from data obtained by contacting 2-methylnaphthalene with a silica-alumina catalyst, at 1100° F. and at 1000° F., in the presence of hydrogen in a molar proportion of hydrogen to methylnaphthalene of about 6:1, and in the absence of hydrogen at 1000° F., and 1100° F., and for various contact times. It will be observed therefrom that at 1100° F., when hydrogen is used, the yield of naphthalene falls off as the contact time is increased. At 1000° F., it will be noted, the yields are much higher for the longer contact times than when runs are made at 1100° F. As indicated in Fig. 3, longer contact times can be used at lower temperatures. In contrast thereto, the yields obtained at these temperatures when no hydrogen was added were much lower than when hydrogen was used. In general, the contact time in the process of this invention can vary within the range of between about one second and about 200 seconds, inclusive, dependent, as stated hereinbefore, upon the temperature. It is preferred to operate for contact times of between about one second and about 20 seconds.

Since the temperatures employed in the process of this invention are well above the boiling point of methylnaphthalenes, it will be apparent that the present process involves a vapor phase operation. Any reaction vessel suitable for carrying out contact catalytic operations can be used. The reactor should be provided with suitable means for maintaining the catalyst temperature. Contact between the catalyst and the charge material can be effected by passing the charge vapors over or through the catalyst. The catalyst can be in the form of a fixed bed or a moving bed. The process, of course, can be performed in a batch process. It is preferable, however, to employ continuous operation. In such an operation, the charge is passed through the reactor in contact with the catalyst. Then the effluent reaction product is subjected to a product separation operation. The portion of the charge stock which remains undemethylated and/or which is incompletely demethylated (as with polymethylnaphthalene charge materials) can be recycled to the reactor, until the maximum ultimate conversion has been effected.

The following examples are for the purpose of demonstrating the process of this invention and the superior results obtained therefrom. It must be strictly understood that this invention is not to be limited by the reactants and conditions used in the examples, or by the operations and manipulations involved therein. As will be apparent to those skilled in the art, other reactants and conditions, as set forth hereinbefore, can be used to practice this invention.

APPARATUS AND OPERATION

The reactor used in the runs described in the examples was a stainless steel tube suspended in a bath of molten lead. The temperature of the lead was controlled to maintain the catalyst temperature constant to within about 10° F. Catalyst temperature was measured by means of thermocouples extending into the top, middle, and bottom portions of the catalyst bed. A total volume of about 150 cubic centimeters of catalyst was placed in the reactor. Accessory equipment included a heated, thermostatically controlled burette for measuring the charge, pumps, preheater coils, a condensing and collecting system for aromatic and gaseous products, and a system for determining the amount of coke on the catalyst by a combustion method.

In operation, the catalyst, at operating temperature, was purged with nitrogen gas, followed by a flushing with hydrogen, when used in the run. Then, the charge material, in the liquid state, together with added gases or liquids was passed through a preheater to raise the temperature thereof to the reaction temperature. The combined charge was then passed downwardly through the catalyst bed at a rate sufficient to effect the desired contact time. A sample of the total gas collected was analyzed in the mass spectrometer to determine its composition and the weight of the components. The principal component was methane.

The amount of coke laid down on the catalyst was determined by combustion methods, i. e., by converting it to carbon dioxide and analyzing therefor. The relative amounts of aromatic materials present in a sample of the liquid products was determined by usual methods, i. e., by mass spectrometer, ultraviolet light spectrometer, distillation, etc.

and results from certain runs set forth in part A thereof, in order to demonstrate the effect of contact time on the yields.

EXAMPLES 19 THROUGH 22

A series of runs were made using 2-methylnaphthalene, and the same catalyst as in the preceding examples. The contact temperature was maintained at 1100° F., while the contact times were at about 5 seconds. The pertinent data and results for these runs are set forth in the last portion of part B of Table I, along with data and results from certain runs set forth in part A thereof, in order to demonstrate the effect of contact time at 1100° F.

Table I.—Demethylation of methylnaphthalene over silica-alumina bead cracking catalyst [a]

| Example | Charge Stock [b] | | Temp., °F. | Length of Run, Min. | Methylnaphthylene [d] L. H. S. V. | Contact Time, sec. [e] | Yield of Products, Weight Percent Per Pass | | | | | Yield of Products, Ultimate Weight Percent [f] | | |
|---|---|---|---|---|---|---|---|---|---|---|---|---|---|---|
| | g. | g./min. | | | | | Naphthalene | Residue | Coke | Gas | Total | Naphthalene | Coke | Gas |
| A. 1 | 48.6 | 1.97 | 950 | 24.6 | 0.803 | 10.1 | 9.1 | 79.9 | 6.0 | 0.8 | 95.7 | 57.2 | 37.8 | 5.0 |
| 2 | 48.4 | 2.0 | 950 | 24.2 | 0.812 | 10.0 | 7.9 | 82.4 | 6.6 | 0.8 | 97.7 | 51.7 | 43.1 | 5.2 |
| 3 | 48.4 | 2.0 | 950 | 24.2 | 0.810 | 10.0 | 10.7 | 76.2 | 7.0 | 0.8 | 94.8 | 57.8 | 37.9 | 4.3 |
| 4 | [c] 48.5 | 1.93 | 1,000 | 25.1 | 0.785 | 10.0 | 15.5 | 72.7 | 8.3 | 1.2 | 97.6 | 62.0 | 33.2 | 4.8 |
| 5 | 48.3 | 1.92 | 1,000 | 25.2 | 0.779 | 10.2 | 14.1 | 73.3 | 7.7 | 1.4 | 96.5 | 60.8 | 33.2 | 6.0 |
| 6 | 48.4 | 1.93 | 1,000 | 25.1 | 0.784 | 10.0 | 16.3 | 71.5 | 9.5 | 1.2 | 98.5 | 60.4 | 35.2 | 4.4 |
| 7 | 48.4 | 1.92 | 1,000 | 25.2 | 0.779 | 10.1 | 14.5 | 70.9 | 8.9 | 1.4 | 95.7 | 58.5 | 35.9 | 5.6 |
| 8 | 99.0 | 1.93 | 1,000 | 51.3 | 0.800 | 10.0 | 13.0 | 75.3 | 6.8 | 1.4 | 96.5 | 61.3 | 32.0 | 6.7 |
| 9 | 98.6 | 1.93 | 1,000 | 51.1 | 0.784 | 10.0 | 11.8 | 79.0 | 7.0 | 1.3 | 99.7 | 58.7 | 34.8 | 6.5 |
| 10 | [c] 48.4 | 1.80 | 1,100 | 26.8 | 0.732 | 10.0 | 21.5 | 58.3 | 14.2 | 3.1 | 97.1 | 55.3 | 36.7 | 8.0 |
| 11 | 48.5 | 1.81 | 1,100 | 26.8 | 0.735 | 9.9 | 23.5 | 53.8 | 15.9 | 3.1 | 96.3 | 55.3 | 37.4 | 7.3 |
| 12 | 48.7 | 1.81 | 1,100 | 26.7 | 0.735 | 10.0 | 20.0 | 57.2 | 15.5 | 1.4 | 94.2 | 54.2 | 42.0 | 3.8 |
| 13 | 98.2 | 1.79 | 1,100 | 54.9 | 0.725 | 10.1 | 19.0 | 61.7 | 12.9 | 3.2 | 96.8 | 54.1 | 36.8 | 9.1 |
| B. 14 | [c] 48.5 | 3.83 | 1,000 | 12.6 | 1.558 | 5.0 | 11.4 | 82.6 | 6.6 | 0.8 | 101.3 | 60.4 | 35.2 | 4.4 |
| 15 | 48.4 | 3.87 | 1,000 | 12.5 | 1.57 | 5.0 | 9.3 | 81.8 | 6.2 | 0.8 | 98.1 | 57.0 | 38.1 | 4.9 |
| 16 | 48.4 | 3.83 | 1,000 | 12.6 | 1.56 | 5.0 | 9.5 | 81.8 | 6.6 | 0.8 | 98.7 | 56.2 | 39.1 | 4.7 |
| 17 | 97.7 | 3.74 | 1,000 | 26.2 | 1.514 | 4.9 | 8.1 | 86.5 | 4.9 | 0.7 | 100.2 | 59.0 | 35.8 | 5.2 |
| 18 | 98.9 | 3.76 | 1,000 | 26.3 | 1.527 | 5.1 | 10.4 | 83.0 | 5.5 | 0.8 | 99.7 | 62.4 | 32.7 | 4.9 |
| 4 | [c] 48.5 | 1.93 | 1,000 | 25.1 | 0.785 | 10.0 | 15.5 | 72.7 | 8.3 | 1.2 | 97.6 | 62.0 | 33.2 | 4.8 |
| 5 | 48.3 | 1.92 | 1,000 | 25.2 | 0.779 | 10.2 | 14.1 | 73.7 | 7.7 | 1.4 | 96.5 | 60.8 | 33.2 | 6.0 |
| 6 | 48.4 | 1.93 | 1,000 | 25.1 | 0.784 | 10.0 | 16.3 | 71.5 | 9.5 | 1.2 | 98.5 | 60.4 | 35.2 | 4.4 |
| 7 | 48.4 | 1.92 | 1,000 | 25.2 | 0.779 | 10.1 | 14.5 | 70.9 | 8.9 | 1.4 | 95.7 | 58.5 | 35.9 | 5.6 |
| 8 | 99.0 | 1.93 | 1,000 | 51.3 | 0.800 | 10.0 | 13.0 | 75.3 | 6.8 | 1.4 | 96.5 | 61.3 | 32.0 | 6.7 |
| 9 | 98.6 | 1.93 | 1,000 | 51.1 | 0.784 | 10.0 | 11.8 | 79.0 | 7.0 | 1.3 | 99.7 | 58.7 | 34.8 | 6.5 |
| 19 | 48.5 | 3.60 | 1,100 | 13.5 | 1.46 | 5.0 | 14.2 | 65.4 | 11.8 | 2.9 | 94.3 | 49.1 | 40.8 | 10.1 |
| 20 | 48.5 | 3.59 | 1,100 | 13.5 | 1.46 | 5.0 | 16.3 | 68.5 | 13.0 | 2.3 | 100.0 | 51.6 | 41.0 | 7.3 |
| 21 | 48.4 | 3.61 | 1,100 | 13.4 | 1.46 | 5.0 | 16.9 | 67.8 | 10.9 | 1.4 | 97.0 | 57.9 | 37.3 | 4.8 |
| 22 | 98.8 | 3.59 | 1,100 | 27.5 | 1.460 | 5.0 | 14.6 | 72.3 | 9.7 | 1.7 | 98.3 | 56.0 | 37.4 | 6.6 |
| 10 | [c] 48.4 | 1.80 | 1,100 | 26.8 | 0.732 | 10.0 | 21.5 | 58.3 | 14.2 | 3.1 | 97.1 | 55.3 | 36.7 | 8.0 |
| 11 | 48.5 | 1.81 | 1,100 | 26.8 | 0.735 | 9.9 | 23.5 | 53.8 | 15.9 | 3.1 | 96.3 | 55.3 | 37.4 | 7.3 |
| 12 | 48.4 | 1.81 | 1,100 | 26.7 | 0.735 | 10.0 | 20.0 | 57.2 | 15.5 | 1.4 | 94.2 | 54.2 | 42.0 | 3.8 |
| 13 | 98.2 | 1.79 | 1,100 | 54.9 | 0.725 | 10.1 | 19.0 | 61.7 | 12.9 | 3.2 | 96.8 | 54.1 | 36.8 | 9.1 |

A. Constant contact time (10 seconds)—variable temperature.
B. Constant temperature—variable contact time.
[a] Bead cracking catalyst of 42 A. I.-fresh dried (10.1 wt. percent Al₂O₃). Volume of catalyst 150 cc.
[b] 2-Methylnaphthalene—ultraviolet absorption analysis indicated 99.4 percent purity.
[c] Eastman practical 2-methylnaphthalene.
[d] Volume 2-methylnaphthalene charge at 50° C./vol. catalyst/hour.
[e] Based on total charge to reactor and assuming 150 cc. of voids.
[f] Based on ratios of naphthalene, coke and gas.

RUNS IN THE ABSENCE OF ADDED MATERIALS

EXAMPLES 1 THROUGH 13

A series of runs were made in which 2-methylnaphthalene was contacted with a silica-alumina catalyst, in the absence of hydrogen, and at a constant contact time of about 10 seconds. The catalyst was a bead-form silica-alumina catalyst containing about 10.1 per cent, by weight, of alumina, which was produced as described in U. S. Patent No. 2,384,946. In these runs, the temperature was varied to show the yields at various temperatures. Pertinent data and results for these runs are set forth in part A of Table I.

EXAMPLES 14 THROUGH 18

A series of runs were made using the same catalyst as in Examples 1 through 13, and 2-methylnaphthalene. The contact temperature was maintained at about 1000° F., while the contact times were at about 5 seconds. The pertinent data and results for these runs are set forth in the first part of part B of Table I, along with data

RUNS IN THE PRESENCE OF HYDROGEN

EXAMPLES 23 THROUGH 31

A series of runs were made, in which 2-methylnaphthalene was contacted with the silica-alumina catalyst as used in Examples 1 through 22, at various contact times, and under one atmosphere of hydrogen pressure. The temperatures were varied to demonstrate the effect of temperature on the yields of naphthalene. Pertinent data for these runs are set forth in part A of Table II.

EXAMPLES 32 THROUGH 34

A series of runs were made, in which 2-methylnaphthalene was contacted with the silica-alumina catalyst as used in Examples 1 through 22, at various temperatures, for about 10 seconds contact time, and under about 20 atmospheres hydrogen pressure. These runs show the effect of temperature on yield of naphthalene, under the higher pressure conditions. Pertinent data and results for these runs are set forth in part B of Table II.

EXAMPLES 35 AND 36

Two runs were made, in which 2-methylnaphthalene was contacted with the silica-alumina catalyst as used in Examples 1 through 22, at 1100° F., under one atmosphere hydrogen pressure, and for contact times of 19.8 and 24.7 seconds, respectively. Pertinent data and results for these runs are set forth in part C of Table II, along with data and results for certain runs from part A thereof, in order to show the effect of contact time on the yield of naphthalene.

EXAMPLES 37 THROUGH 39

A series of runs were made, in which 2-methylnaphthalene was contacted with the silica-alumina catalyst as used in Examples 1 through 22, at 1000° F., under 40 atmospheres pressure, and for contact times of about 10 seconds. Pertinent data and results for these runs are set forth in Part D of Table II, along with data and results for certain runs from parts A and B thereof, in order to demonstrate the effect of pressure on the yield of naphthalene.

EXAMPLES 40 AND 41

Two runs were made, in which 1-methylnaphthalene was contacted with the silica-alumina catalyst as used in Examples 1 through 22, at temperatures of 1000° F. and 1100° F., for various contact times, and under one atmosphere of hydrogen pressure. Pertinent data and results for these runs are set forth in Table II, part E.

Table II.—Demethylation of methylnaphthalene over bead catalyst [a]

[Hydrogen added to the charge.]

| Example | Charge Stock [b] | | Hydrogen Added | | | Temp., °F. | Pressure | | Length of Run, min. | Methyl-naphthalene L. H. S. V.[d] | Contact Time, Sec.[e] |
|---|---|---|---|---|---|---|---|---|---|---|---|
| | G. | G./Min. | cc./Min. at S. T. P. | Moles | Moles Per Mole Charge | | Lb. Gauge | Atmos. | | | |

A. EFFECT OF TEMPERATURE (CONSTANT CONTACT TIMES—ONE ATMOSPHERE PRESSURE)

| 23 | 99.1 | 0.55 | 520 | 4.18 | 6.0 | 1,000 | | | 1 | 180 | 0.226 | 5.0 |
| 24 | 98.6 | 0.51 | 244 | 4.16 | 6.0 | 1,100 | | | 1 | 192 | 0.208 | 5.0 |
| 25 | 98.6 | 0.30 | 486 | 4.16 | 6.0 | 900 | | | 1 | 334 | 0.120 | 10.0 |
| 26 | c 48.35 | 0.28 | 272 | 2.06 | 6.0 | 950 | | | 1 | 170 | 0.115 | 10.1 |
| 27 | c 47.45 | 0.29 | 238 | 1.72 | 5.2 | 1,000 | | | 1 | 162 | 0.119 | 10.7 |
| 28 | 98.9 | 0.28 | 260 | 4.17 | 6.0 | 1,000 | | | 1 | 359 | 0.112 | 10.0 |
| 29 | 48.4 | 0.28 | 260 | 2.04 | 6.0 | 1,000 | | | 1 | 176 | 0.114 | 10.0 |
| 30 | c 48.4 | 0.26 | 242 | 2.03 | 6.0 | 1,100 | | | 1 | 188 | 0.105 | 10.1 |
| 31 | 48.4 | 0.26 | 260 | 2.18 | 6.4 | 1,100 | | | 1 | 188 | 0.105 | 9.5 |

B. EFFECT OF TEMPERATURE (CONSTANT CONTACT TIMES—TWENTY ATMOSPHERES PRESSURE)

| 32 | 98.6 | 5.90 | 5,580 | 4.16 | 6.0 | 900 | 280 | 20 | 16.7 | 2.40 | 10.0 |
| 33 | 98.5 | 5.49 | 5,170 | 4.15 | 6.0 | 1,000 | 280 | 20 | 18.0 | 2.22 | 9.9 |
| 34 | 98.7 | 5.49 | 5,170 | 4.15 | 6.0 | 1,000 | 280 | 20 | 18.0 | 2.23 | 10.1 |

C. EFFECT OF CONTACT TIME (CONSTANT TEMPERATURES—ONE ATMOSPHERE PRESSURE)

| 23 | 99.1 | 0.55 | 520 | 4.18 | 6.0 | 1,000 | | | 1 | 180 | 0.226 | 5.0 |
| 27 | c 47.45 | 0.29 | 238 | 1.72 | 5.2 | 1,000 | | | 1 | 162 | 0.119 | 10.7 |
| 28 | 98.9 | 0.28 | 260 | 4.17 | 6.0 | 1,000 | | | 1 | 359 | 0.112 | 10.0 |
| 29 | 48.4 | 0.28 | 260 | 2.04 | 6.0 | 1,000 | | | 1 | 176 | 0.114 | 10.0 |
| 24 | 98.6 | 0.51 | 244 | 4.16 | 6.0 | 1,100 | | | 1 | 192 | 0.208 | 5.0 |
| 30 | c 48.4 | 0.26 | 242 | 2.03 | 6.0 | 1,100 | | | 1 | 188 | 0.105 | 10.1 |
| 31 | 48.4 | 0.26 | 260 | 2.18 | 6.4 | 1,100 | | | 1 | 188 | 0.105 | 9.5 |
| 35 | 48.4 | 0.13 | 123 | 2.05 | 6.0 | 1,100 | | | 1 | 372 | 0.053 | 19.8 |
| 36 | 34.5 | 0.12 | 96 | 1.21 | 4.9 | 1,100 | | | 1 | 282 | 0.050 | 24.7 |

D. EFFECT OF PRESSURE (CONSTANT CONTACT TIMES AND TEMPERATURES)

| 25 | 98.6 | 0.30 | 486 | 4.16 | 6.0 | 900 | | | 1 | 334 | 0.120 | 10.0 |
| 32 | 98.6 | 5.90 | 5,580 | 4.16 | 6.0 | 900 | 280 | 20 | 16.7 | 2.40 | 10.0 |
| 27 | c 47.45 | 0.29 | 238 | 1.72 | 5.2 | 1,000 | | | 1 | 162 | 0.119 | 10.7 |
| 28 | 98.9 | 0.28 | 260 | 4.17 | 6.0 | 1,000 | | | 1 | 359 | 0.112 | 10.0 |
| 29 | 48.4 | 0.28 | 260 | 2.04 | 6.0 | 1,000 | | | 1 | 176 | 0.114 | 10.0 |
| 33 | 98.5 | 5.49 | 5,170 | 4.15 | 6.0 | 1,000 | 280 | 20 | 18.0 | 2.22 | 9.9 |
| 34 | 98.7 | 5.49 | 5,170 | 4.15 | 6.0 | 1,000 | 280 | 20 | 18.0 | 2.23 | 10.1 |
| 37 | 98.6 | 11.00 | 10,350 | 4.16 | 6.0 | 1,000 | 575 | 40 | 9.0 | 4.46 | 10.0 |
| 38 | 98.8 | 10.93 | 10,350 | 4.20 | 6.0 | 1,000 | 575 | 40 | 9.1 | 4.43 | 10.0 |
| 39 | 99.3 | 10.80 | 10,250 | 4.22 | 6.1 | 1,000 | 575 | 40 | 9.2 | 4.39 | 10.1 |

E. DEMETHYLATION OF 1-METHYLNAPHTHALENE

| 40 | i 41.5 | 0.213 | 242 | 2.11 | 7.2 | 1,100 | | | 1 | 195 | 0.080 | 10.9 |
| 41 | i 52.5 | 0.490 | 203 | 1.06 | 2.9 | 1,000 | | | 1 | 107 | 0.162 | 12.1 | a Bead cracking catalyst of 42 A. I.—fresh dried (10.1 wt. percent Al₂O₃). Volume of catalyst—150 cc.
b 2-methylnaphthalene—Reilly (purified; ultra-violet analysis indicated 99.4% purity)—unless otherwise indicated.
c 2-methylnaphthalene—Eastman practical.
d Volume—2-methylnaphthalene charge at 50° C./vol. catalyst/hour.
e Based on total charge to reactor and assuming 150 cc. of voids.
f Both yield per pass and ultimate yield are expressed as weight percent of methylnaphthalene charged.
g Based on ratios of naphthalene, coke and gas.
h Liquid boiling below 200° C. Refractive index n$_D^{20}$ 1.4900–1.5200.
i 1-methylnaphthalene.

[Hydrogen added to the charge.]

| Example | Yield of Products, Weight Percent Per Pass | | | | | | Yield of Products, Ultimate Weight Percent | | | |
|---|---|---|---|---|---|---|---|---|---|---|
| | Naphthalene | Residue | Coke | Low [h] Boilers | Gas | Total [t] | Naphthalene | Coke | Low [h] Boilers | Gas |

A. EFFECT OF TEMPERATURE (CONSTANT CONTACT TIMES—ONE ATMOSPHERE PRESSURE)

| | | | | | | | | | | |
|---|---|---|---|---|---|---|---|---|---|---|
| 23 | 8.7 | 87.4 | 3.4 | | 0.3 | 99.8 | 69.9 | 27.7 | | 2.4 |
| 24 | 17.3 | 69.4 | 8.1 | | 0.9 | 95.7 | 65.8 | 30.8 | | 3.5 |
| 25 | 6.8 | 87.8 | 3.0 | | 0.2 | 97.8 | 67.7 | 30.3 | | 2.0 |
| 26 | 14.1 | 80.5 | 3.5 | | 0.8 | 98.9 | 76.4 | 19.1 | | 4.5 |
| 27 | 19.7 | 70.3 | 7.8 | | 0.8 | 98.6 | 69.6 | 27.4 | | 3.0 |
| 28 | 12.3 | 81.4 | 4.2 | | 0.6 | 98.5 | 71.8 | 24.7 | | 3.5 |
| 29 | 16.7 | 76.9 | 6.6 | | 1.0 | 101.2 | 68.7 | 27.1 | | 4.2 |
| 30 | 32.6 | 49.2 | 14.3 | | 2.5 | 98.6 | 66.2 | 28.8 | | 5.0 |
| 31 | 25.0 | 58.3 | 12.6 | | 2.7 | 98.6 | 62.0 | 31.3 | | 6.7 |

B. EFFECT OF TEMPERATURE (CONSTANT CONTACT TIMES—TWENTY ATMOSPHERES PRESSURE)

| | | | | | | | | | | |
|---|---|---|---|---|---|---|---|---|---|---|
| 32 | 7.1 | 78.6 | 6.9 | 1.0 | 0.2 | 93.8 | 46.6 | 45.3 | 6.7 | 1.3 |
| 33 | 15.3 | 68.9 | 9.9 | 1.4 | 1.6 | 97.1 | 54.3 | 34.9 | 5.0 | 5.8 |
| 34 | 13.6 | 70.9 | 10.1 | 1.0 | 1.2 | 96.8 | 52.4 | 39.0 | 3.9 | 4.7 |

C. EFFECT OF CONTACT TIME (CONSTANT TEMPERATURES—ONE ATMOSPHERE PRESSURE)

| | | | | | | | | | | |
|---|---|---|---|---|---|---|---|---|---|---|
| 23 | 8.7 | 87.4 | 3.4 | | 0.3 | 99.8 | 69.9 | 27.7 | | 2.4 |
| 27 | 19.7 | 70.3 | 7.8 | | 0.8 | 98.6 | 69.6 | 27.4 | | 3.0 |
| 28 | 12.3 | 81.4 | 4.2 | | 0.6 | 98.5 | 71.8 | 24.7 | | 3.5 |
| 29 | 16.7 | 76.9 | 6.6 | | 1.0 | 101.2 | 68.7 | 27.1 | | 4.2 |
| 24 | 17.3 | 69.4 | 8.1 | | 0.9 | 95.7 | 65.8 | 30.8 | | 3.5 |
| 30 | 32.6 | 49.2 | 14.3 | | 2.5 | 98.6 | 66.2 | 28.8 | | 5.0 |
| 31 | 25.0 | 58.3 | 12.6 | | 2.7 | 98.6 | 62.0 | 31.3 | | 6.7 |
| 35 | 32.2 | 38.0 | 22.5 | | 4.8 | 97.5 | 54.2 | 37.8 | | 8.0 |
| 36 | 33.9 | 30.4 | 24.1 | | 4.6 | 93.0 | 54.2 | 38.4 | | 7.4 |

D. EFFECT OF PRESSURE (CONSTANT CONTACT TIMES AND TEMPERATURES)

| | | | | | | | | | | |
|---|---|---|---|---|---|---|---|---|---|---|
| 25 | 6.8 | 87.8 | 3.0 | | 0.2 | 97.8 | 67.7 | 30.3 | | 2.0 |
| 32 | 7.1 | 78.6 | 6.9 | 1.0 | 0.2 | 93.8 | 46.6 | 45.3 | 6.7 | 1.3 |
| 27 | 19.7 | 70.3 | 7.8 | | 0.8 | 98.6 | 69.6 | 27.4 | | 3.0 |
| 28 | 12.3 | 81.4 | 4.2 | | 0.6 | 98.5 | 71.8 | 24.7 | | 3.5 |
| 29 | 16.7 | 76.9 | 6.6 | | 1.0 | 101.2 | 68.7 | 27.1 | | 4.2 |
| 33 | 15.3 | 68.9 | 9.9 | 1.4 | 1.6 | 97.1 | 54.3 | 34.9 | 5.0 | 5.8 |
| 34 | 13.6 | 70.9 | 10.1 | 1.0 | 1.2 | 96.8 | 52.4 | 39.0 | 3.9 | 4.7 |
| 37 | 13.9 | 68.3 | 11.0 | 0.3 | 1.3 | 94.8 | 52.5 | 41.3 | 1.2 | 5.0 |
| 38 | 13.3 | 69.7 | 10.0 | 1.8 | | 96.2 | 50.0 | 37.8 | 6.9 | 5.3 |
| 39 | 13.4 | 70.3 | 8.8 | 2.4 | 0.9 | 95.8 | 52.6 | 34.4 | 9.5 | 3.6 |

E. DEMETHYLATION OF 1-METHYLNAPHTHALENE

| | | | | | | | | | | |
|---|---|---|---|---|---|---|---|---|---|---|
| 40 | 31.3 | 30.4 | 13.3 | | 2.3 | 77.3 | 66.7 | 28.3 | | 5.0 |
| 41 | 18.5 | 71.0 | 9.3 | | 1.3 | 100.1 | 63.6 | 31.9 | | 4.5 |

RUNS IN THE PRESENCE OF VARIOUS ADDED MATERIALS

EXAMPLES 42 THROUGH 45

A series of runs were made, in which 2-methylnaphthalene was contacted with the silica-alumina catalyst as used in the preceding examples, for ten-second contact times, at various temperatures, and in the presence of added nitrogen gas under one atmosphere pressure. Pertinent data and results for these runs are set forth in Table III.

EXAMPLE 46

A run was made, in which 2-methylnaphthalene was contacted with the silica-alumina catalyst as used in the preceding examples, at 1000° F., for a ten-second contact time, and in the presence of added benzene. Pertinent data and results of this run are set forth in Table III.

EXAMPLE 47

A run was made, in which 2-methylnaphthalene was contacted with the silica-alumina catalyst as used in the preceding examples, at 1000° F., for a ten-second contact time, and in the presence of added cyclohexane. Pertinent data and results for this run are set forth in Table III.

EXAMPLE 48

A run was made, in which 2-methylnaphthalene was contacted with the silica-alumina catalyst as used in the preceding examples, at 1000° F., for a ten-second contact time, and in the presence of added methylcyclohexane. Pertinent data and results for this run are set forth in Table III.

Table III. — Demethylation of methylnaphthalene over silica-alumina bead cracking catalyst [a]

[Nitrogen or monocyclic hydrocarbon added to the charge]

| Example | Type | Moles | Moles/Mole Charge | Charge Stock [b] G. | Charge Stock [b] G./Min. | Temp., °F. | Length of Run, Min. | Methyl-naphtha-L. H. S. V. [c] | Contact Time, Sec. [d] | Yield of Products, [e,J] Weight Per cent Per Pass Naphthalene | Resi-due | Coke | Gas | Total | Yield of Products, [e,f] Ultimate Weight Percent Naphthalene | Coke | Gas |
|---|---|---|---|---|---|---|---|---|---|---|---|---|---|---|---|---|---|
| 42 | Nitrogen | 4.16 | 6.0 | 98.6 | 0.28 | 1,000 | 358 | 0.112 | 10.0 | 15.1 | 75.2 | 8.1 | 1.0 | 99.4 | 62.3 | 33.5 | 4.2 |
| 43 | ...do | 4.16 | 6.0 | 98.6 | 0.28 | 1,000 | 358 | 0.112 | 10.0 | 14.0 | 74.9 | 7.8 | 1.0 | 97.7 | 61.3 | 34.2 | 4.5 |
| 44 | ...do | 4.17 | 6.0 | 98.5 | 0.26 | 1,100 | 384 | 0.104 | 10.0 | 19.4 | 58.5 | 15.7 | 2.1 | 95.7 | 52.1 | 42.2 | 5.7 |
| 45 | ...do | 4.16 | 6.0 | 98.6 | 0.26 | 1,100 | 383 | 0.105 | 10.0 | 21.1 | 51.6 | 20.0 | 2.2 | 95.3 | 48.3 | 45.7 | 6.0 |
| 46 | Benzene | 0.695 | 1.0 | 98.6 | 0.97 | 1,000 | 102 | 0.391 | 10.0 | 13.9 | 77.1 | 7.6 | 1.3 | [g] 99.9 | 60.9 | 33.3 | 5.8 |
| 47 | Cyclo-hexane | 0.694 | 1.0 | 98.6 | 0.96 | 1,000 | 102 | 0.391 | 10.0 | 11.9 | 79.7 | 6.2 | 1.1 | [h] 98.9 | 61.9 | 32.3 | [h] 5.8 |
| 48 | Methyl-cyclo-hexane | 0.681 | 1.0 | 98.4 | 0.98 | 1,000 | 100 | 0.399 | 10.0 | 11.5 | 84.2 | 5.6 | 1.1 | [i] 102.4 | 63.2 | 30.8 | [i] 6.0 |

(a) Bead cracking catalyst of 42 A. I.—Fresh dried (10.1 wt. percent Al₂O₃). Vol. of catalyst—150 cc.
(b) 2-methylnaphthalene—ultraviolet analysis indicated 99.4 percent purity.
(c) Volume 2-methylnaphthalene charge at 50° C./vol. catalyst/hour.
(d) Based on total charge to reactor and assuming 150 cc. of voids.
(e) Both yield per pass and ultimate yield are expressed as weight percent of methylnapthalene charged.
(f) Based on ratios of naphthalene, coke and gas.
(g) Unreacted benzene was recovered as a product but is not included in the yield in the table.
(h) Recovered hydrocarbon boiling in the cyclohexane range was not analyzed.
(i) Recovered monocyclic hydrocarbon analyzed by mass spectrometer. Mole percent composition: 82.1 percent methylcyclohexane, 10.9 percent benzene, 5.1 percent toluene, 1.0 percent methylcyclohexene, 0.6 percent xylene, 0.3 percent propylbenzene.
(j) All analyses for naphthalene by ultraviolet absorption analysis of 200–235° C. fraction.

From the preceding examples taken in conjunction with the figures, it will be apparent that the present process, using hydrogen gas, effects superior yields of demthylated products. It will be noted, also, that the addition of an inert gas, such as nitrogen, for a diluent has little effect on the yield. Likewise, the use of other materials such as benzene, cyclohexane, and methylcyclohexane, which are considered potential sources of hydrogen, have no advantageous effect. It is only by the use of hydrogen that the advantages of the present process are achieved. In order to illustrate this, the data for runs using various added materials are set forth in a summary in Table IV.

Table IV.—Demethylation of methylnaphthalene [a]

[Comparison of effects of added materials.]

| Added Material | Naphthalene Yield Ultimate Weight Percent | Weight Percent Per Pass |
|---|---|---|
| Hydrogen | 70 | 16 |
| Methylcyclohexane | 63 | 12 |
| Nitrogen | 62 | 15 |
| Cyclohexane | 62 | 12 |
| Benzene | 61 | 14 |
| None | 60 | 14 |

[a] Bead catalyst, 42 A. I.; 1,000° F.; 10 second contact time.

The products produced by the process of this invention have many uses and applications well known to those familiar with the art. Thus, naphthalene is a well known larvicide, and an intermediate for the production of phthalic anhydride by oxidation thereof. Methylphthalic anhydrides are produced from methylnaphthalenes.

Although the present invention has been described with preferred embodiments, it is to be understood that modifications and variations can be resorted to without departing from the spirit and scope of this invention, as those skilled in the art will readily understand. Such variations and modifications are considered to be within the scope and purview of the appended claims.

What is claimed is:

1. A process for the demethylation of methylnaphthalenes, which comprises contacting a methylnaphthalene with a silica-alumina cracking catalyst, containing between about 5 per cent and about 20 per cent, by weight, of alumina, at a temperature of between about 900° F. and about 1200° F., for a period of time of between about one second and about 60 seconds, and in the presence of hydrogen gas at substantially atmospheric pressure.

2. A process for the demethlyation of methylnaphthalenes, which comprises contacting a methylnaphthalene with a silica-alumina catalyst, containing between about 8 per cent and about 15 per cent, by weight, of alumina, at a temperature of between about 900° F. and about 1100° F., for a period of time of between about one second and about 20 seconds, and in the presence of hydrogen gas at substantially atmospheric pressure.

3. A continuous process for the demethylation of methylnaphthalenes, which comprises contacting a methylnaphthalene with a silica-alumina catalyst, containing between about 8 per cent and about 15 per cent, by weight, of alumina, at a temperature of between about 900° F. and about 1100° F., for a period of time of between about one second and about 20 seconds, in the presence of hydrogen gas at substantially atmospheric pressure, separating the demethylated methylnaphthalene from the undemethylated methylnaphthalenes, and recycling said undemethylated methylnaphthalenes.

4. A process for the production of naphthalene from a monomethylnaphthalene, which comprises contacting a monomethylnapththalene with a silica-alumina catalyst, containing between about 8 per cent and about 15 per cent, by weight, of alumina, at a temperature of between about 900° F. and about 1100° F., for a period of time of between about one second and about 20 seconds, and in the presence of hydrogen gas at substantially atmospheric pressure.

5. A continuous process for the production of naphthalene from a monomethylnaphthalene, which comprises contacting a monomethylnaphthalene with a silica-alumina catalyst, containing between about 8 per cent and about 15 per cent, by weight, of alumina, at a temperature of between about 900° F. and about 1100° F., for a period of time of between about one second and about 20 seconds, in the presence of hydrogen gas at substantially atmospheric pressure, separating naphthalene from undemethylated methylnaphthalenes, and recycling said undemethylated methylnaphthalenes.

6. The process for the production of naphthalene from a monomethylnaphthalene, which comprises contacting 2-methylnaphthalene with a silica-alumina catalyst, containing between about 8 per cent and about 15 per cent, by weight, of alumina, at a temperature of between about 900° F. and about 1100° F., for a period of time of between about one second and about 20 seconds, and in the presence of hydrogen gas at substantially atmospheric pressure.

7. A process for the production of naphthalene from a monomethylnaphthalene, which comprises contacting 2-methylnaphthalene with a bead-form silica-alumina catalyst, containing about 10 per cent, by weight, of alumina, at about 900° F. to 1100° F., for 10 seconds, and in the presence of hydrogen gas at substantially atmospheric pressure.

8. A process for the production of naphthalene from a monomethylnaphthalene, which comprises contacting 1-methylnaphthalene with a silica-alumina catalyst, containing between about 8 per cent and about 15 per cent, by weight, of alumina, at a temperature of between about 900° F. and about 1100° F., for a period of time of between about one second and about 20 seconds, and in the presence of hydrogen gas at substantially atmospheric pressure.

9. A process for the production of naphthalene from a monomethylnaphthalene, which comprises contacting 1-methylnaphthalene with a bead-form silica-alumina catalyst containing about 10 per cent, by weight, of alumina, at a temperature of between about 900° F. and about 1100° F., for about 10 seconds, and in the presence of hydrogen gas at substantially atmospheric pressure.

References Cited in the file of this patent

UNITED STATES PATENTS

| | | |
|---|---|---|
| 2,194,449 | Sachanen et al. | Mar. 19, 1940 |
| 2,380,279 | Welty | July 10, 1945 |
| 2,384,942 | Marisic | Sept. 18, 1945 |
| 2,436,698 | Oblad | Feb. 24, 1948 |

OTHER REFERENCES

Thomas et al.: Jour. Am. Chem. Soc., vol. 66, pages 1694–6, 3 pages (October 1944).

Sachanen (B), Conversion of Petroleum, 2nd edition, page 88, New York (1948).